United States Patent Office 3,188,751
Patented June 15, 1965

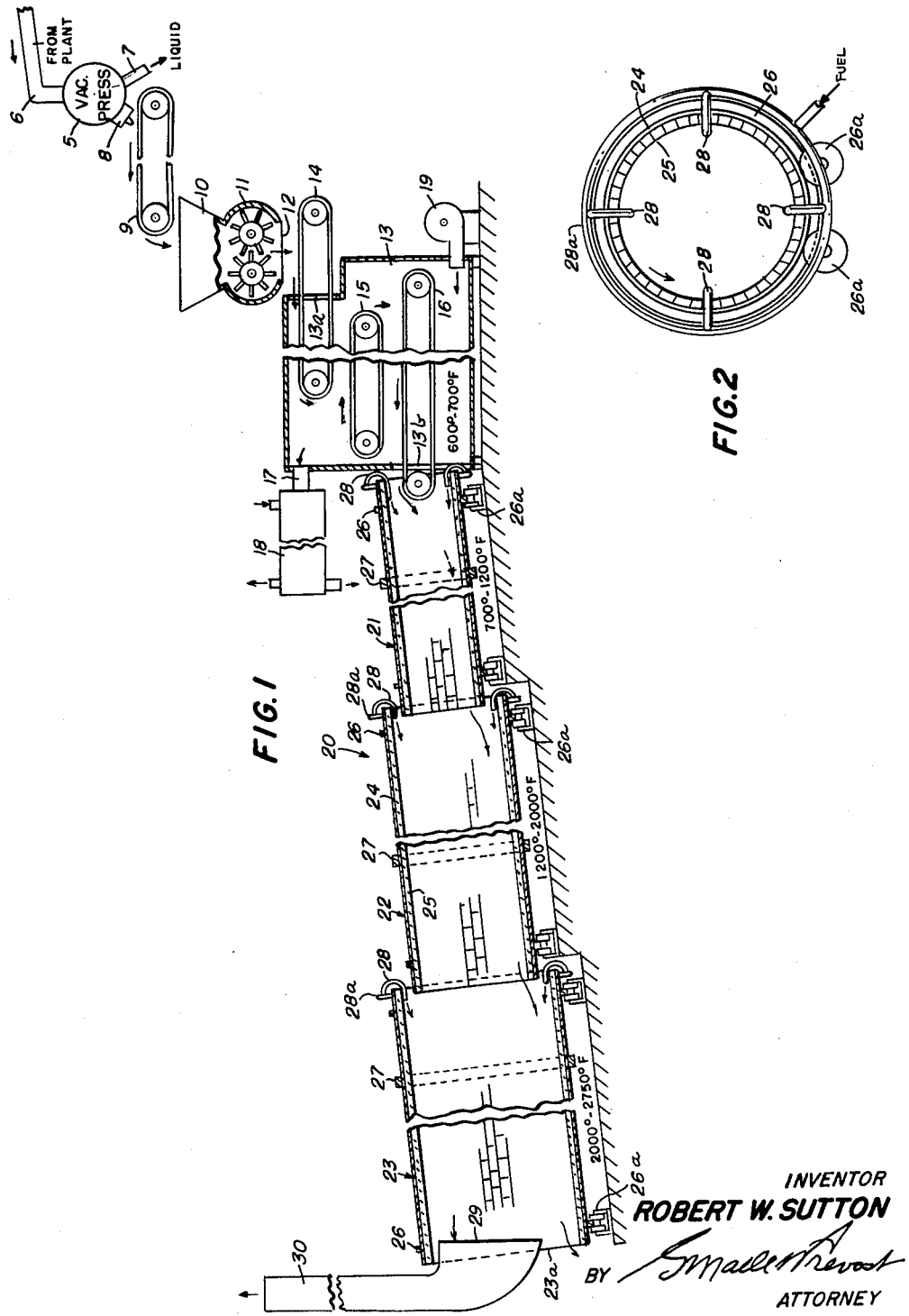

3,188,751
METHOD OF PRODUCING BUILDING AGGREGATE UTILIZING SLUDGE RESIDUE FROM PAPER DE-INKING PROCESS
Robert W. Sutton, Falls Church, Va., assignor, by direct and mesne assignments, to The Hydrand Corporation, a corporation of Delaware
Filed Oct. 29, 1962, Ser. No. 233,549
6 Claims. (Cl. 34—12)

This invention relates to a method and apparatus for the production of building aggregate, and consists more paritcularly in new and useful improvements embodying the utilization of the sludge residue from the conventional de-inking process of a fine paper manufacturing plant as the primary ingredient for the manufacture of building aggregate.

In the manufacture of fine papers, large quantities of rags, old newspapers, magazines and other printed materials are re-processed, and in order to properly condition these materials for the paper manufacturing plant, they must first be treated in a de-inking process. For many years, the residue or sludge from these de-inking processes which comes out of the paper mill, mixed with great quantities of dirty water, has created a tremendous problem because of the resultant pollution of streams and lakes in the vicinity of the mill. Usually, this residue is simply discharged into settling basins and ultimately piled on the ground in huge mounds, and it has been impossible to prevent the rains from carrying the water off of these mounds along with certain deleterious matter in the residue, and ultimately depositing it in streams and lakes, and, as a result, many valuable fish and water life are killed.

It is the primary object of the present invention to provide a method and apparatus whereby this heretofore useless and objectionable residue from the de-inking process can be converted into a highly useful aggregate which has been found to possess properties rendering it equally as effective as cement in the manufacture of building blocks.

Another object of the invention is to provide a method and apparatus of this character wherein the sludge or residue of a de-inking process is subjected to a drying and progressive heat treatment which renders it highly effective as a building aggregate for various uses, including the manufacture of building blocks.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout both views:

FIG. 1 is a diagrammatic view showing a longitudinal section of the apparatus employed in practising this invention; and FIG. 2 is an enlarged end elevational view of a typical drum of the progressive heating assembly of the apparatus.

In the drawings which are simply for illustrating one form of apparatus for practising the invention, 5 represents a conventional vacuum press which is located at the sludge outlet of the de-inking plant (not shown), where the sludge, containing from 18% to 35% moisture, is fed to the vacuum press, through a discharge conduit or the like 6. As will later appear, two or more of these vacuum presses may be employed and alternately arranged so that while one is in operation, another is being charged with sludge. The liquid extracted by the vacuum press 5 is discharged through outlet 7 into tank cars or large road trucks, and it is interesting to note that this material has been found to be useful as a road binder, and it also has properties which enable it to kill weeds along the sides of the road.

In the vacuum press, the major portion of the moisture is removed from the sludge, which is discharged through a suitable outlet 8 onto an endless conveyor 9 which deposits it in the hopper 10, of any suitable lump breaking device 11 where the masses of vacuum pressed sludge are broken up into sizes suitable for conveying through the system. Analysis of the material discharged from the vacuum press through outlet 8 shows that it comprises the following ingredients in the proportions indicated:

| | Percent |
|---|---|
| Moisture | 2.4 |
| Volatile materials | 31.16 |
| Fixed carbon | 2.74 |
| Ash | 63.70 |
| Sulphur | .10 |

From the lump breaking device 11, the material is discharged through outlet 12 onto a series of endless conveyors which conduct it through a preliminary drying chamber 13, maintained at a temperature of from 600°–700° F. The top conveyor 14 initially introduces the material into the upper portion of the drying chamber 13, through inlet 13a, and deposits it upon an oppositely traveling conveyor 15 which, in turn, deposits it on a conveyor 16, the discharge end of which extends through the discharge opening 13b in the drying chamber and terminates within the inlet end of the drying kiln.

Preferably, the vapors generated in the drying chamber 13 are discharged through outlet 17 to a suitable condenser 18, and either an oil fired or gas fired burner 19 may be employed for the purpose of heating the drying chamber.

A kiln assembly generally indicated by the numeral 20, comprises a series of progressively heated drums 21, 22 and 23, which, as shown in FIG. 1, are preferably arranged in declining relation from inlet to outlet, as and for the purpose hereinafter described. Except for size, each of the drums of the kiln 20 are similarly constructed and comprise an outer shell 24 of cylindrical form, internally lined with fire brick 25, designed to withstand the required high temperature conditions of the kiln. The smaller or inlet drum 21 of the series is arranged with its inlet end adjacent the outlet opening 13b of the drying chamber for receiving the discharge end of the final endless conveyor 16, and its discharge end fits within the inlet end of the next larger drum 22 which, in turn, is arranged with its discharge end within the inlet end of the final and larger drum 23. Each of these drums is provided with peripheral guide rings 26, running on rollers 26a of any suitable type and the outer peripheries of the drums carry ring gears 27, respectively adapted for operative engagement with driving gears (not shown), whereby the drums may be constantly rotated throughout the operation of the kiln, the declining relation of the series of drums causing the material deposited in the kiln to progressively advance by gravity and agitation, from one drum to the next.

At the inlet end of each drum, I provide a series of jet burners 28, either gas or oil fired, preferably connected to a manifold 28a, in annularly spaced relation and directed longitudinally of the drums so as to equally distribute the heat introduced into the drums. The discharge end 23a of the final drum 23 is closed at its upper portion by a hood 29 which discharges the fumes from the kiln through a suitable stack 30.

The temperatures maintained in the respective drums 21–23 are preferably as follows:

Drum 21 _____ from 700°–1200° F.
Drum 22 _____ from 1200°–2000° F.
Drum 23 _____ from 2000°–2750° F.

and it is important to note that these three stages of controlled heat treatment are essential to the successful operation of this method.

The overall kiln assembly is approximately 360 feet long from the discharge end of the drying chamber 13 to the discharge end of the final drum 23, and the diameters of the drums run from 10 feet at the small end of the kiln to 16 feet at the discharge end. The particular declining relation of the heating drums of the kiln and the speed of rotation of said drums, together with the rate of travel of the endless conveyors 14–16, are such as to cause the material to pass through the system in from 25–30 minutes minimum time, and when the material is discharged through discharge end 23a of drum 23, it is in the form of a pure white aggregate and broken up into particle sizes of from ⅜ths of an inch, down to fine. An analysis of this discharged aggregate is substantially as follows:

| | Percent |
|---|---|
| Carbon | 16.7 |
| Hydrogen | 3.0 |
| Sulphur | 0.4 |
| Oxygen and nitrogen | 22.7 |
| Ash | 57.2 |
| Cellulose | 37.5 |

It may be noted that there are certain variances between the carbon and the cellulose ingredients.

It has been found that this final product which includes its own fine for binding purposes, is highly adaptable for use in the manufacture of building blocks which have the same p.s.i. as conventional cement blocks. However, this product is far less subject to water and moisture absorption than cement blocks. In the manufacture of blocks from this aggregate, it may be noted that the regular cement formula may be used, but no sand is required, as this material possesses its own binding ingredient, as before indicated, and the resultant block is actually stronger than the ordinary cement block.

As before indicated, the controlled heating process is critical to the successful operation of this invention, and in order to insure complete control, suitable thermostats and other conventional control means may be employed.

It will be apparent that the present invention not only produces an exceptionally useful building aggregate, but fills the long felt need of disposing of the residue from de-inking processes which, until now, has been a completely useless and harmful material.

From the foregoing, it is believed that the invention may be readily understood by those skilled in the art without further description, it being borne in mind that numerous changes may be made in the details disclosed without departing from the spirit of the invention as set forth in the following claims.

I claim:

1. A method of producing a building aggregate including as ingredients, carbon, hydrogen, sulfur, oxygen, nitrogen, ash and cellulose from the sludge residue of a conventional de-inking process employed in paper manufacture and including as ingredients, moisture, volatile materials, fixed carbon, ash and sulfur, said method, comprising removing the major portion of liquid from said sludge, breaking the resultant material into particles, conveying said particles through an initial drying zone to reduce the moisture content thereof to from 18–35%, agitating said particles while conducting the same through a plurality of heating zones, respectively maintaining at progressively increased temperatures within the range of from 700° F.–2750° F., and discharging the dried and heated product from the final heating zone.

2. A method of producing a building aggregate including as ingredients, carbon, hydrogen, sulfur, oxygen, nitrogen, ash and cellulose from the sludge residue of a conventional de-inking process employed in paper manufacture and including as ingredients, moisture, volatile materials, fixed carbon, ash and sulfur, said method, comprising reducing the liquid content of said sludge, breaking the resultant material into particles, conveying said particles through an initial drying zone to reduce the moisture content thereof to from 18–35%, subjecting the dried particles to a continuous series of successive heating stages, respectively maintained at temperatures of from 700° F.–1200° F., 1200° F.–2000° F., and 2000° F.–2750° F., and discharging the dried and heated product from the final heating stage.

3. A method as claimed in claim 2, wherein the time element from the initial drying zone to the point of discharge from the final heating stage is from 25–30 minutes.

4. A method of producing a building aggregate including as ingredients, carbon, hydrogen, sulfur, oxygen, nitrogen, ash and cellulose from the sludge residue of a conventional de-inking process employed in paper manufacture and including as ingredients, moisture, volatile materials, fixed carbon, ash and sulfur, said method, comprising demoisturizing said sludge, breaking up the demoisturized material into particles, conveying said particles through an initial drying zone maintained at a temperature of from 600° F.–700° F., conducting the dried particles through three successive heating zones, respectively maintained at progressively increased temperatures of from 700° F.–1200° F., from 1200° F.–2000° F., and from 2000° F.–2750° F., and discharging the dried and heated product from the final heating zone.

5. A method as claimed in claim 4, wherein the time element from the initial drying zone to the point of discharge from the final heating zone is from 25–30 minutes.

6. A method of producing a pure white building aggregate having substantially the following analysis:

| | Percent |
|---|---|
| Carbon | 16.7 |
| Hydrogen | 3.0 |
| Sulfur | 0.4 |
| Nitrogen and oxygen | 22.7 |
| Ash | 57.2 |
| Cellulose | 37.5 | from the sludge residue of a conventional de-inking process employed in paper manfacture and having substantially the following analysis:

| | Percent |
|---|---|
| Moisture | 2.4 |
| Volatile materials | 31.16 |
| Fixed carbon | 2.75 |
| Ash | 63.70 |
| Sulfur | .10 | said method comprising demoisturizing said sludge, breaking up the demoisturized material into particles, conveying said particles through an initial drying zone maintained at a temperature of from 600 F.–700° F., conducting the dried particles through three successive heating zones, respectively maintained at progressively increased temperatures of from 700° F.–1200° F., from 1200° F.–2000° F., and from 2000° F.–2750° F., and discharging the dried and heated product from the final heating zone.

References Cited by the Examiner

UNITED STATES PATENTS

| | | |
|---|---|---|
| 1,828,270 | 10/31 | Anderson. |
| 2,015,050 | 9/35 | Baird et al. _____ 110—12 |
| 2,063,630 | 12/36 | Schilling _____ 110—12 |
| 2,116,059 | 5/38 | Connolly _____ 34—12 X |
| 2,238,161 | 4/41 | Drew et al. _____ 34—135 X |

NORMAN YUDKOFF, *Primary Examiner.*